Jan. 22, 1924.

H. C. EINSTEIN

SELECTOR MECHANISM

Filed June 23, 1922

1,481,507

5 Sheets-Sheet 1

INVENTOR.
Howard C. Einstein
BY
Fay, Oberlin & Fay
ATTORNEYS

Jan. 22, 1924

H. C. EINSTEIN

SELECTOR MECHANISM

Filed June 23, 1922

1,481,507

5 Sheets-Sheet 2

INVENTOR.
Howard C. Einstein
BY
Fay, Oberlin & Fay
ATTORNEYS

Jan. 22, 1924.

H. C. EINSTEIN

SELECTOR MECHANISM

Filed June 23, 1922

1,481,507

5 Sheets-Sheet 5

INVENTOR.
Howard C. Einstein
BY
Fay, Oberlin & Fay
ATTORNEYS

Patented Jan. 22, 1924.

UNITED STATES PATENT OFFICE.

HOWARD C. EINSTEIN, OF CLEVELAND, OHIO.

SELECTOR MECHANISM.

Application filed June 23, 1922. Serial No. 570,467.

*To all whom it may concern:*

Be it known that I, HOWARD C. EINSTEIN, a citizen of the United States, and a resident of Cleveland, county of Cuyahoga, and State of Ohio, have invented a new and useful Improvement in Selector Mechanism, of which the following is a specification, the principle of the invention being herein explained and the best mode in which I have contemplated applying that principle, so as to distinguish it from other inventions.

This invention relates to card accounting machinery, in general, and in particular, to machinery used in mechanical production control.

In essence, it comprises a method whereby a given set of cards, having certain designations marked thereon by means of punched holes, can be used with a machine for selecting from a group of similar cards, such cards as contain corresponding designations, respectively.

In particular, it comprises a machine wherein certain cards, containing certain predetermined records, recorded thereon by perforations, said perforations presenting information determined by the location of said perforations on said cards, upon being passed through a machine, will cause said machine to be set in such a manner that the successive passing through the machine of another group of cards, also containing information recorded by perforations, and the presenting of these cards successively to the mechanism will cause these mechanisms to operate, when, and only when, the designating perforations in the selecting cards correspond with those of the presented cards; after which, the operation of said mechanisms, actuated by the above correspondence, presents a new selecting card to the mechanism for future correspondence with the presented cards which are being continuously presented; said mechanisms in operating, acting to remove the presented card which corresponded with the selecting card and to replace it with a duplicate card, of special design, as desired.

The advantage of the machine will appear from the following description.

In the accompanying drawings:—

Figure 1:
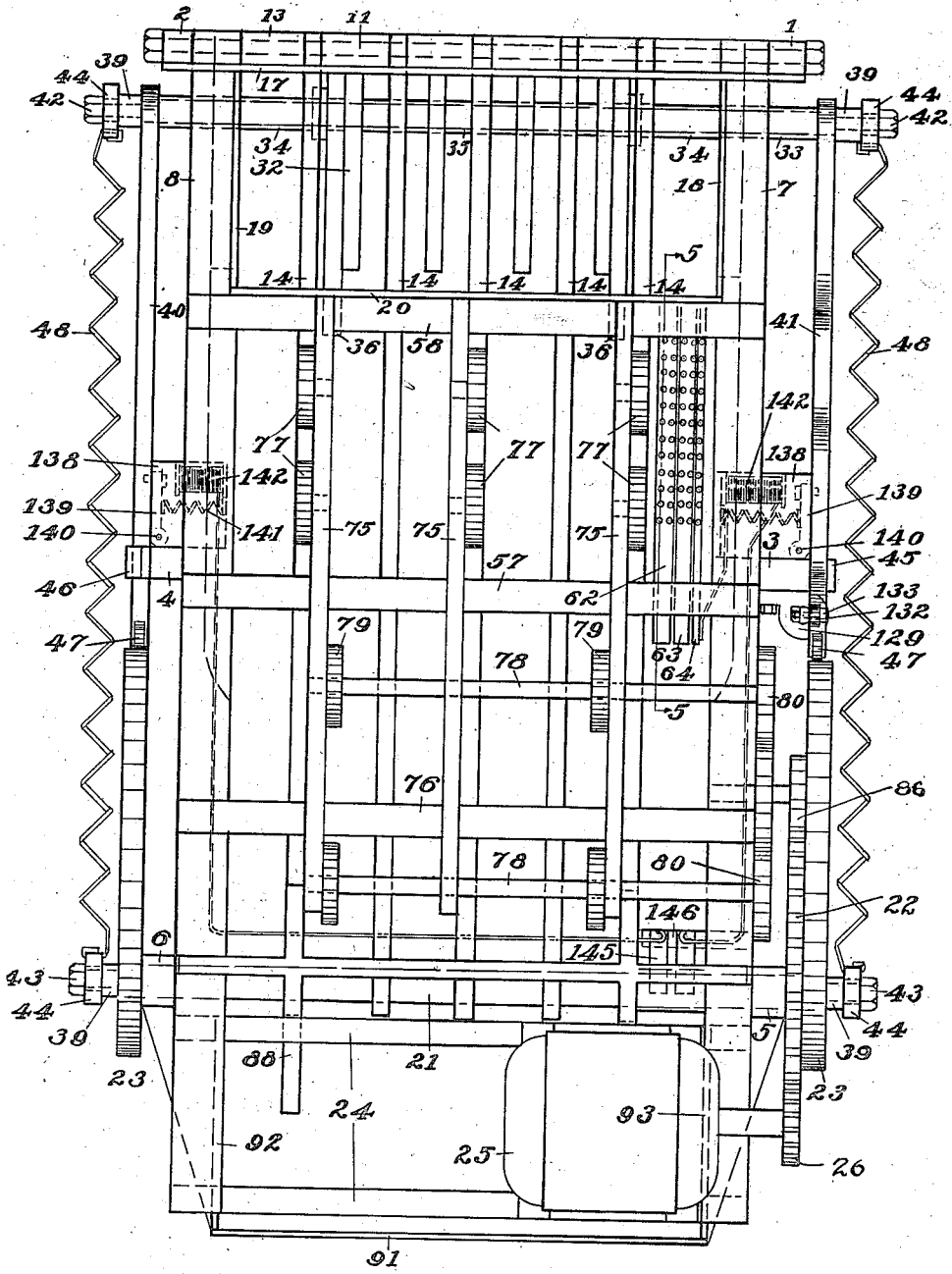
Figure 2:
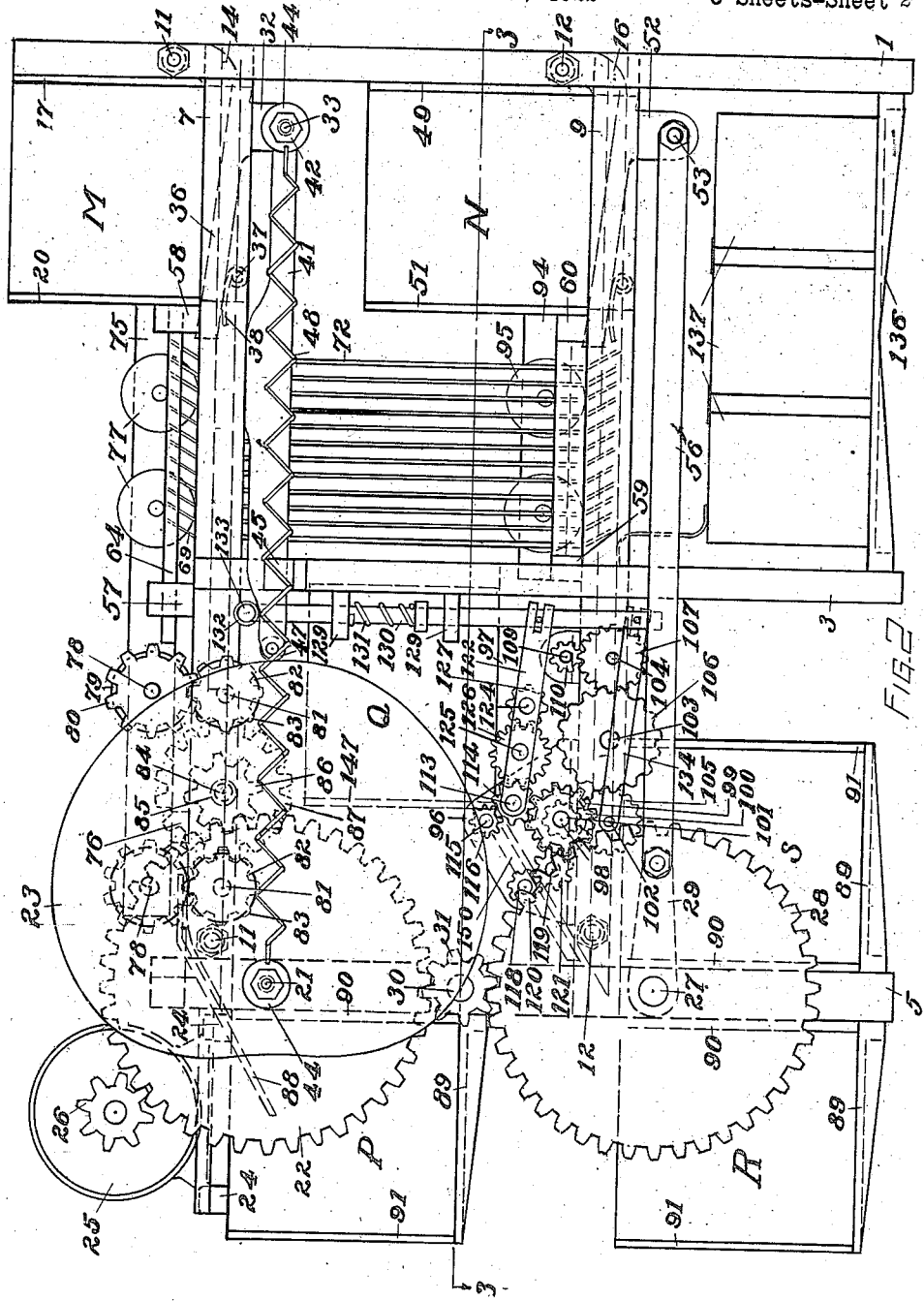
Figure 3:
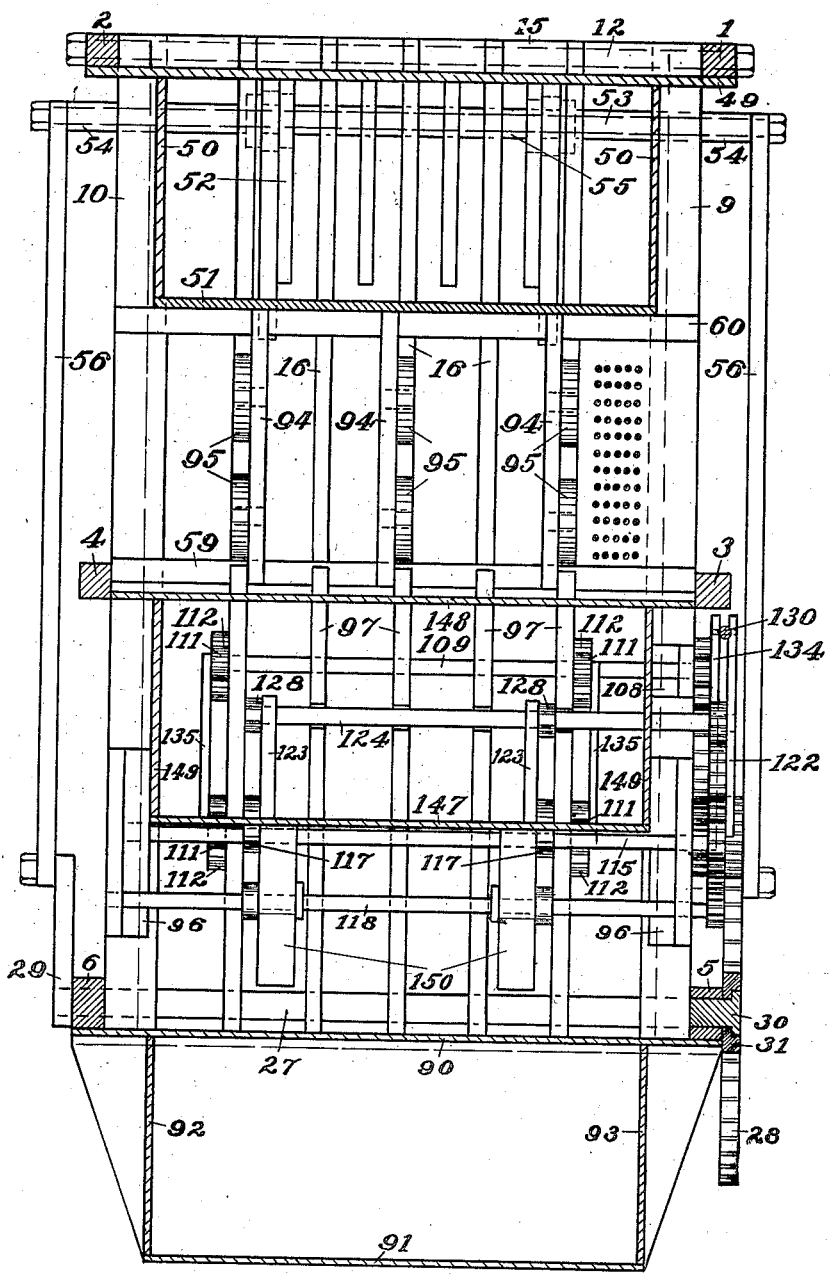
Figure 4:
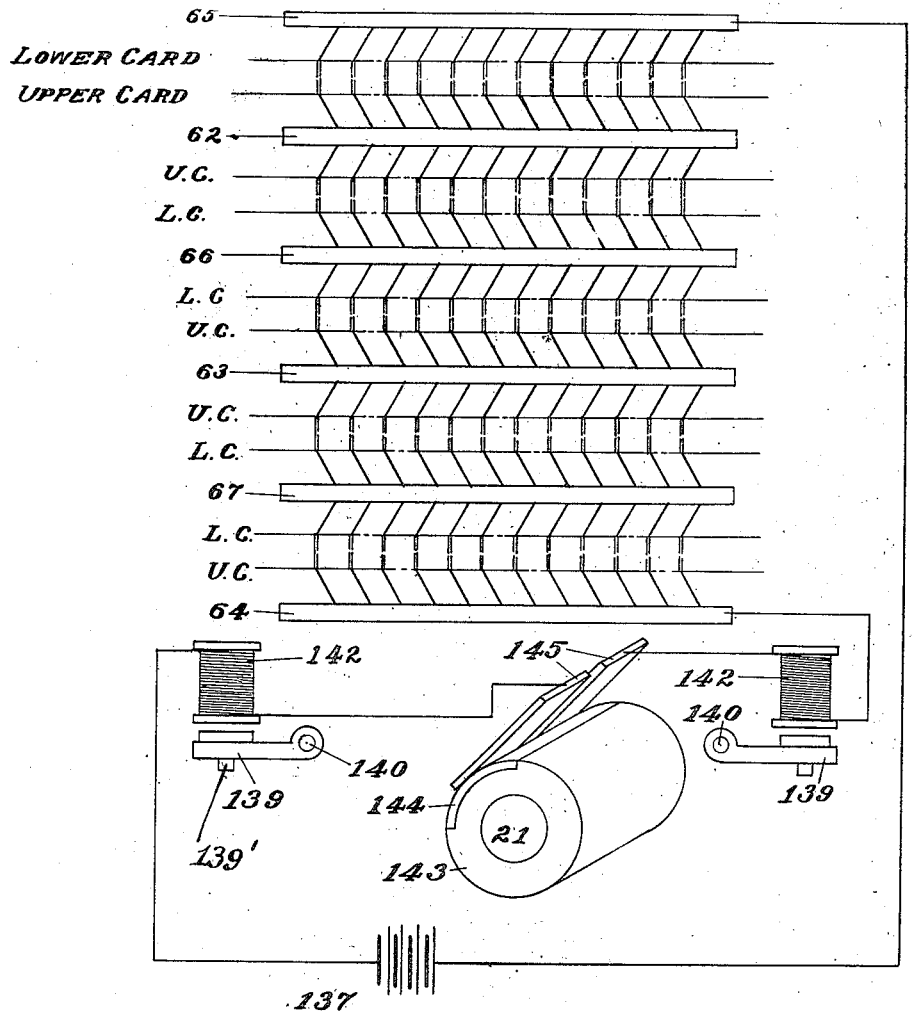
Figure 5:
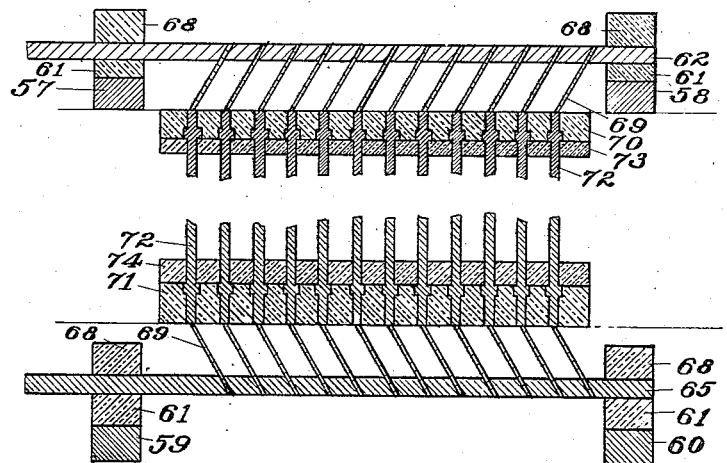
Figure 6:
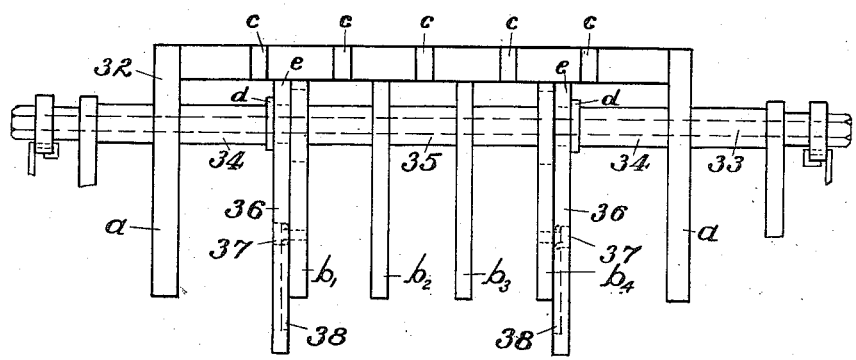

Fig. 1 represents a plan view of the machine; Fig. 2 represents a right-hand elevation of the machine; Fig. 3 represents a plan view taken from section line 3—3 in Fig. 2; Fig. 4 is a schematic diagram to show the electrical circuits and the wiring of the mechanism; Fig. 5 is a partial section taken at 5—5 on Fig. 1 to show the arrangement of the electric wires and the bus bars at this point; and Fig. 6 is a partly detailed drawing of the cross head mechanism.

Referring to Figs. 1, 2 and 3, there are three pairs of uprights 1 and 2, 3 and 4, and 5 and 6. Fixedly attached to 1, 3 and 5 are longitudinal bars 7 and 9, and fixedly attached to 2, 4 and 6 are longitudinal bars 8 and 10. Pairs of tie rods 11 and 12 hold these members together to form a rigid framework for the machine. A group of five upper carriers 14 are mounted on tie rods 11, and separated by spacers 13. Similarly, a group of five lower carriers 16 are mounted on rods 12, and spaced by means of spacers 15.

Fixedly attached to uprights 1 and 2 is plate 17. Fixedly attached to plate 17 and to bars 7 and 8 are plates 18 and 19, respectively. Fixedly attached to plates 18 and 19 is plate 20. These four plates 17, 18, 19 and 20 together form a receiving hopper M for what may be termed the selecting cards. These cards, when placed therein, rest upon the upper carriers 14.

An upper main operating shaft 21 is rotatably mounted in uprights 5 and 6. Fixedly attached to main shaft 21 are two cams 23 and gear 22. Fixedly attached to the extensions of upper longitudinal bars 7 and 8 are two cross bars 24, upon which a motor 25 is mounted. Upon the motor shaft is mounted gear 26, which meshes with gear 22; thus furnishing the moving power for the machine.

Rotatably mounted in uprights 5 and 6 is lower main shaft 27. Fixedly attached to shaft 27 is gear 28 and crank 29. A stud 30 is fixedly mounted on upright 5, and pinion 31 is rotatably mounted thereon. Pinion 31 meshes with gears 22 and 28.

In grooved ways in upper members 7 and 8, is mounted cross head 32 (see also Fig. 6) adapted to reciprocate therein. Projections $a$ of this cross head are adapted to slidably reciprocate in these grooved ways, while fingers $b_1, b_2, b_3$ and $b_4$ are directly beneath the cards in hopper M. This cross head is suitably slotted at points $c$ to permit the free clearance of carriers 14. Upper cross head pin 33 is rotatably mounted in lugs on $b_1$ and $b_4$. Two spacers 34 are mounted on pin 33, and, between these lugs, is mounted one spacer 35. Fingers 36 are rotatably mounted on spacers 34, being positioned by shoulders "d" on said spacers. Studs 37 are mounted on fingers $b_1$ and $b_4$ and upon them are mounted springs 38. The springs are tensed to force fingers 36 in a clockwise direction (in Fig. 2). The lugs "e" on these fingers strike the back of the cross head and prevent their further motion in that direction.

The back of the cross head, where it joins the fingers, projects above these fingers $b_1$ to $b_4$, an amount slightly less than the thickness of one card of the type used in the machine and is so adapted that it will engage the bottom card in the hopper to the exclusion of the others and carry said card forward on the card path.

Mounted on cross pins 33 are upper connecting roads 40 and 41. Two nuts 42 hold the various parts on cross pin 33 to form a rigid unit. Two nuts 43 locate the various mechanisms on main shaft 21. Two pairs of collars 44 are rotatably mounted on sleeves 39 and positioned by the shoulders on these sleeves, and nuts 42 and 43 respectively. Two springs 48 are in constant tension between opposite pairs of collars 44 and are fixedly attached to each pair respectively. Connecting rod 41 is supported by support 45 mounted on upright 3, while connecting rod 40 is supported by support 46, mounted on upright 4. Rollers 47 are mounted rotatably on shafts in connecting rods 40 and 41 respectively, as shown.

Plate 49 is fixedly attached to uprights 1 and 2. Plates 50 are fixedly attached to longitudinal bars 9 and 10, and to plate 49. Plate 51 is fixedly attached to plates 50. Plates 49, 50, and 51 together form a card receiving hopper for what may be termed the presented cards and is located directly above lower carriers 16.

A cross head 52, similar in construction to upper cross head 32, reciprocates slidably in grooved ways in members 9 and 10. Cross pin 53 is rotatably mounted in lugs on 52. Spacers 54 and 55 act as a compression member and as mounts for the fingers respectively, in the same manner as used in the upper cross head.

Connecting rods 56 are rotatably mounted on sleeves 54 and linked to gear 28 and crank 29 respectively. Hence the rotation of the gear 28 reciprocates the cross head 52 in the grooved ways in members 9 and 10.

Lateral bars 57 and 58 are mounted on 7 and 9, and bars 59 and 60 are mounted on 9 and 10 (see Fig. 5). Blocks 61, made out of suitable electrical insulating material and suitably grooved, are mounted on these bars. Set in the grooves in upper blocks 61 are mounted three bus bars 62, 63 and 64 and in lower blocks 61 are mounted bus bars 65, 66 and 67. Additional blocks 68, of suitable insulating material, are clamped on top of these bus bars through blocks 61 to their respective lateral bars; thus holding these bus bars fixedly in position.

Wire brushes 69 are yieldably mounted in these bus bars, as shown, in rows of twelve, corresponding in their number to twelve possible perforations in any column in the card in consideration. Any number of brushes may be used, the number being dependent solely on the type of card adopted in the system, without going beyond the scope of this invention. Two rows of these brushes are mounted in bars 62, 63, 66 and 67 and one row in bars 64 and 65. This arrangement is designed for the use of a five column designating number in the cards used. It is clear that the design may be adapted to any number of columns of any arrangement without going beyond the scope of this invention.

Beneath the upper brushes is plate 70, made of suitable insulating material and mounted on longitudinal bars 7 and 8. On lower bars 9 and 10 a similar plate 71 is mounted. Between these two plates and mounted therein are a plurality of electrical conducting rods 72, each rod corresponding to its homologous pair of brushes in the upper and lower construction groups. These rods are held in position in blocks 70 and 71 by blocks 73 and 74, which are also of suitable insulating material. The brushes are mounted in a manner to contact with the rods below or above them and to spring out of contact by the insertion of a card between them and their respective rods.

Lateral bars 76 are fixedly mounted on members 7 and 8. Three roller bars 75 are mounted on lateral bars 57 and 58 and lateral bar 76. Rollers 77, having a yielding surface or tread of rubber or similar material, are rotatably mounted on studs, mounted on these bars, directly above carriers 14, being positioned to position a card below the brushes. Two shafts 78 are rotatably mounted in bars 75. Rollers 79 and gears 80 are fixedly mounted on shafts 78. Shafts 81 (see Fig. 2) are rotatably mounted in longitudinal bars 7 and 8. Rollers 82 and gears 83 are fixedly mounted on shafts 81, gears 83 meshing with gears 80, and rollers 82 contacting with rollers 79.

Stud 84 is fixedly mounted in member 7. Sleeve 85 is rotatably mounted on stud 84. Gears 86 and 87 are fixedly mounted on sleeve 85, gear 86 meshing with gear 22, and gear 87 meshing with gears 83. A deflector 88 is fixedly attached to uprights 5 and 6 and used to deflect the selecting cards into hopper P.

Three brackets 89 are fixedly attached to uprights 5 and 6. Three sets of plates 90, 91, 92 and 93 are mounted on brackets 89 as shown, to form what may be termed receiving hoppers P, R, and S.

Three roller bars 94 (see Figs. 2 and 3) are mounted on lateral bars 59 and 60 and carry a plurality of studs on which are rotatably mounted rollers 95. These rollers are suitably located above carriers 16 to position thereon cards fed above the brushes.

Two brackets 96 are located on and fixedly attached to longitudinal bars 9 and 10. Four plates 97 are located and spaced as shown between brackets 96, and uprights 3 and 4. Tie rods and spacers which position these plates are omitted to avoid complications, but their construction is simple and identical in principle to tie rods 11.

Fixedly attached to uprights 3 and 4 is plate 148 (see Fig. 3). Plates 149 are fixedly attached thereto and to these plates is attached plates 147; the four plates being arranged to form what may be termed the insert hopper.

Rotatably mounted in brackets 96 and plates 97 is shaft 98. Three gears 99, 100 and 101 are fixedly attached to this shaft, gear 100 meshing with gear 28. Shafts 102, 103 and 104 are rotatably mounted in longitudinal members 9 and 10. Gears 106 and 107 are fixedly mounted on shafts 103 and 104, and gear 105 is rotatably mounted on shaft 102. These gears mesh, as shown; with gear 105 also meshing with gear 101.

Bracket 108 (see Fig. 3) is mounted fixedly on member 9. Shaft 109 (see Fig. 2) is rotatably mounted in bracket 108 and plates 97. Gear 110 is fixedly mounted on shaft 109 and meshes with gear 107. Two rollers 111 are fixedly mounted on shaft 109, and opposite them, and contacting with them, are two rollers 112 mounted on shaft 104. Two pairs of similar rollers are mounted on shafts 98 and 102.

Shaft 113 is rotatably mounted in bracket 96 and plates 97. Gear 114 is rotatably mounted thereon and meshes with gear 99. Shaft 115 is rotatably mounted in brackets 96, and gear 116 is fixedly mounted thereon and meshes with gear 114. Two pairs of rollers 117 are mounted on shafts 113 and 115, opposite rollers contacting with each other. Two shafts 118 and 119 are rotatably mounted in brackets 96, and two gears 120 and 121 are fixedly mounted on each, respectively. Gear 121 meshes with gear 99 and also with gear 120. Two pairs of rollers are located opposite each other on shafts 118 and 119, respectively. Two deflectors, 150, are mounted on two shafts 115 and 118, as shown; being positioned by shoulders on shaft 118 and the rollers attached thereto.

Arm 122 and two arms 123 (see also Fig. 3) are fixedly mounted on shaft 113. Shaft 124 is rotatably mounted in these three arms. Stud 125 is fixedly mounted on arm 122. Gear 126 is rotatably mounted on stud 125, and meshes with gear 114.

Gear 127 is fixedly mounted on shaft 124 and meshes with gear 126. Two rollers 128 are fixedly mounted on shaft 124. Two brackets 129 are fixedly mounted on upright 3. Plunger 130 is adapted to reciprocate in these brackets. Spring 131 acting between a shoulder on 130 and upper bracket 129, tends to depress a plunger 130. The roller 132 is rotatably mounted on stud 133, which is fixedly attached to plunger 130. Roller 132 travels on an upper cam surface on connecting rod 41.

Arm 122 is linked to plunger 130 to oscillate as the plunger reciprocates. Arm 134 is fixedly mounted on shaft 102 and linked to plunger 130 to oscillate as it reciprocates.

Fixedly attached to shaft 102 are two deflector arms 135, positioned thereon as shown.

Bracket 136 is mounted between uprights 1 and 2, and 3 and 4, and is adapted to hold a series of electric batteries 137, or other suitable source of current.

Two plates 138 are mounted fixedly on members 7 and 8, respectively (see Fig. 1). On each arms 139 are adapted to oscillate around studs 140, fixedly mounted thereon. Projections 139' on arms 139 mesh with holes in connecting rods 40 and 41, and lock these connecting rods in the position shown at Fig. 1. Springs 141, being in compression, hold arms 139 in this position. Electro-magnets 142 are mounted on plates 138, in positions so that, when energized, they act on a magnetic plate on arms 139 and retract them, thus releasing connecting rods 40 and 41.

A circuit interrupter is located on shaft 21 (see also Fig. 4). It consists of a plate 146 of suitable non-conducting material, mounted on member 7. Two brushes 145 are yieldably mounted on this plate. A cylinder 143 of suitable non-conducting material is mounted on shaft 71, and a conducting plate 144, fixedly mounted on cylinder 143, is adapted to contact with the brushes 145 at periodic intervals. The brushes are adapted to ride on plate 144 or cylinder 143. Thus a circuit, in series with the interrupter, just described, has its circuit broken at this point and then c'osed again in suitable intervals as desired.

Referring to Fig. 4, the outline of the connections is clear. The circuit passes from the battery to the bus bar 65, to the brushes, through the conducting rods to bus bar 62, thence back to bus bar 66, thence to bus bar 63, thence to bus bar 67, and through to bus bar 64. From there it passes to one electromagnet 142, to the circuit interrupter 143, to the other electro-magnet 142 and back to the battery.

This comprises the main features of the mechanism. The method of selecting cards is shown here with electric connections as the factors which control the selecting. However, mechanical or other agencies may be used in effecting the same result without departing from the invention.

The operation of the machine described is as follows:—

We have a series of cards with records thereon; said records being recorded by means of perforations in predetermined positions on said cards, said perforations determining the records by their positions therein. The purpose of this machine is to select, from a group of other cards, cards having entries over a predetermined range, identical to the cards which determine the selecting. All the cards have distinct designating numbers, shown by means of perforations as is customary in the card accounting art. In this case I have devoted the first five columns on the cards for the designating number, thus permitting a five column or five digit number for each card; it, however, being apparent that any number or arrangement of columns may be used without in any way altering the basic construction or scope of this invention.

The selecting cards, being these cards which have the designating numbers recorded thereon, corresponding to the designating numbers on the cards in the presented card group, which it is desired to select, are arranged in order in sequence according to their designating numbers and placed in hopper M. The cards from which selections are to be made, referred to hereafter as the presented cards, are placed in a similar sequence in hopper N. Other special cards which may be termed insert cards are placed in hopper Q. These last cards are of use when it is desirable to replace the removed cards in their original sequence, as described later.

The motor is started and rotates gears 22 and 28, thus actuating the connecting rods and reciprocating the upper and lower cross heads. The lower cross head is reciprocated by direct connection. As the circuit interrupter is designed to close the circuit just previous to the position shown at Fig. 1, and as there is nothing between the brushes and their respective conducting rods to prevent contact, the circuit is completely closed and the current flows through the electromagnets. This acts to retract the arms 139 and thus releases the upper connecting rods 40 and 41. The springs being free to act, bring rollers 47 against the cams 23 and the cams permit the upper connecting rods to follow a course determined by said cams. This causes the reciprocation of the upper cross head.

The circuit interrupter breaks the circuit as soon as the holes in the connecting rods are clear of the projections on arms 139 with which they mesh when the arms are not retracted. These arms are free to ride on the surfaces of the upper connecting rods.

Both cross heads start to move forward. The slight projection on each engages the bottom card in the hoppers M and N, respectively and carries it under its respective set of brushes.

The cards are left there and the connecting rods return with their respective cross heads to the original position. At the end of travel the arms 139 engage the holes in the upper connecting rods and lock them in that position. When the circuit interrupter again closes the circuit, the cards under each set of brushes break the circuits at all points except where holes are punched.

It is observable that each card breaks the circuit in five places and that these places are arranged by pairs, in series between each of the six bus bars and the bus bars are conected in series so that a break in the circuit between any pair of them will break the entire circuit. It is clear that the current flowing from a bus bar can only flow along the conductor rod which corresponds to the hole in the card between it and the brushes and that this flow will be interrupted by the second card unless there is a hole punched in the second card in the same relative position. And it follows that the entire circuit cannot be closed again until both cards have all five holes in the same relative positions, or, in other words, until the card from the present card hopper has the same designation as the card from the selecting card hopper; or, in effect, until the card desired from the lower or presented group of cards arrives above the lower brushes.

If the first card presented is not the card so corresponding in designation to the first selecting card, the circuit remains broken and the upper connecting rods and cross head remain locked. Thus the selecting card beneath the upper brushes remains in its position and the feeding of selecting cards from the selecting card hopper is arrested.

The lower cross head, however, continues to operate and feeds new cards from the presented card group in the lower hopper N successively into position under the lower brushes. On the lower cross heads return, fingers 36 are depressed by the card between the brushes and the conducting rods until they clear the trailing edge of the card. They are then actuated by springs 38 and lifted sufficiently to engage this edge on their forward movement and to push it out from under the brushes down the lower card path, thus clearing the space for the next card. The circuit interrupter breaks the circuit, in each cycle, before the lower card has been moved an appreciable amount.

The train of gears, previously described, are being driven continuously. Thus, the card is gripped by rollers 112 and 111 and conveyed, through the successive rotating rollers in the lower card path to the discard hopper R.

When a card arrives above the lower brushes which corresponds in designation to the selecting card beneath the upper brushes, the circuit closes and the upper connecting rods are thus released. The connecting rods 40 and 41 move forward and the upper cross head acts in a manner identical to the lower cross head in removing the first selecting card from beneath the upper brushes and replacing it with the second selecting card from hopper M. The first card is carried between the rolls 79 and 82 and conveyed by them, successively to the upper receiving hopper P.

The roller 132 travels on the upper cam surface on connecting rod 41 and lifts plunger 130 accordingly. This lifts arm 134, rotates shaft 102 and obtrudes deflectors 135 across the path of the presented card which is being carried along the lower card path. These arms deflect this card into receiving hopper S. There is thus accumulated in hopper S a series of cards removed from the presented cards, which correspond in their identifying designation to the selecting cards, accumulating in hopper P.

Near the end of the forward travel, the plunger 130 is further raised. Arm 122 is now lifted a sufficient amount to be effective. The rotating rollers, mounted on arms 124 are thus brought into contact with the bottom insert card in the insert hopper Q. This moves the bottom card a sufficient amount to permit of its being gripped by rollers 117 by which it is fed into the discard hopper R. Thus, whenever a card is removed from the group of presented cards, which are being continuously fed from hopper N to hopper R, and deflected into hopper S, a special card is fed from hopper Q into hopper R in its place and in the same relative order to the other cards that the removed card had. This is for use in rearranging the cards in their old order, as will be described later.

Meanwhile the cross heads return for new cards; these new cards are brought into position from the selecting and presented card hoppers as required and the cycle is completed. When all the cards in hopper M have been exhausted and carried to hopper P, the operation is complete and there will be a card in hopper S for each card in hopper P, with the designations of each card in hopper S corresponding to the identifying designation of each card in hopper P respectively. In addition we have in hopper R, also presented cards, not selected, and with them at the points in sequence corresponding to the proper positions of the presented cards selected, we have insert cards from hopper Q, one for each presented card selected.

When it is desired to replace the selected cards removed from the presented cards in their previous positions, the presented cards not selected, together with their inserted insert cards are placed in hopper N. A group of insert cards are placed in hopper M, these insert cards having the same designations on them as the ones which were previously used in hopper Q. The cards which were previously selected from the presented cards are placed in hopper Q.

As all the insert cards contain the same designation, the former presented cards, not selected, will pass to hopper R, as before since none of them have designations like the ones used on the insert cards. When the first insert card arrives under the conducting rods on the lower card path, it co-acts with the insert card of the same designation which was fed from hopper M to a position under the brushes on the upper card path. The selecting mechanism is thus actuated to feed this first insert card on the lower card path into hopper S. The insert hopper Q being actuated, the first card in it is fed into hopper R in place of the insert card which was fed into hopper S. As this card from hopper Q was the first presented card selected, and as it is taking the place of the first insert card previously inserted, it is obviously returning to its original position among the presented cards; and in the same manner all presented cards, previously selected, are returned to their former order with respect to all the presented cards.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention :—

1. In a card selecting mechanism, the combination of means adapted to receive a guide card bearing certain perforations therein, said means also being adapted to pass therethrough a series of data cards also bearing various perforations, means including elements engaging in certain perforations on said guide card, said elements being adapted to engage in predetermined perforations in one of said data cards, a receiving hopper actuated by said means upon engagement of said elements, and said hopper being rendered operative to receive one of said data cards upon the engagement of said elements in the desired predetermined perforations therein.

2. In a card selecting mechanism, the combination of means adapted to receive a guide card bearing certain perforations therein, said means also being adapted to pass therethrough a series of data cards also bearing various perforations, means including elements engaging in certain perforations on said guide card; said elements being adapted to engage in predetermined perforations in one of said data cards, a receiving hopper actuated by said means upon engagement of said elements, and said hopper being rendered operative to receive one of said data cards upon the engagement of said elements in the desired predetermined perforations therein, and means adapted to thereupon remove said guide card from said card receiving means.

3. In a card selecting mechanism, the combination of means adapted to receive a guide card bearing certain perforations therein, said means also being adapted to pass therethrough a series of data cards also bearing various perforations, means including elements engaging in certain perforations on said guide card, said elements being adapted to engage in predetermined perforations in one of said data cards, a receiving hopper actuated by said means upon engagement of said elements, and said hopper being rendered operative to receive one of said data cards upon the engagement of said elements in the desired predetermined perforations therein, and means adapted to remove said guide cards and similarly position a second guide card in said card receiving means.

4. In a card selecting mechanism, the combination of means adapted to receive a guide card bearing certain perforations therein, said means also being adapted to pass therethrough a series of data cards also bearing various perforations, means including an electrical circuit, said circuit having contacts engaging in certain perforations on said guide cards and being normally open until closed by engagement of said contacts through predetermined perforations in one of said data cards, and a receiving hopper actuated by the closing of said circuit to receive such data card bearing predetermined desired perforations.

5. In a card selecting mechanism, the combination of means adapted to receive a guide card bearing a certain perforation therein, said means being also adapted to pass therethrough a series of data cards also bearing perforations, means including an electrical circuit, said circuit having contacts engaging in such certain perforations in said guide cards and being normally open until closed by engagement of said contacts through a corresponding predetermined perforation in one of said cards, and a receiving hopper actuated by the closing of said circuit to receive such data card bearing such predetermined desired perforation.

6. In a card selecting mechanism, the combination of means adapted to receive a guide card bearing a certain perforation therein, said means being also adapted to pass therethrough a series of data cards also bearing perforations, means including an electrical circuit and circuit breaker therein, and said circuit having contacts engaging in certain perforations in guide cards received by said first named means, and said circuit being inoperative until closed, first by engagement of said contacts through a series of predetermined perforations in one of said cards, then by said breaker, and a receiving hopper actuated by the closing of said circuits to receive such data card bearing predetermined desired perforations.

7. In card selecting mechanism, the combination of means adapted to pass therethrough a series of guide cards bearing variously arranged perforations therein, other means adapted to pass therethrough a series of data cards also bearing variously arranged perforations, and selecting means actuated by certain perforations in said guide cards, said means being adapted to select and remove from said mechanism any of said data cards having an arrangement of perforations identical with those on said guide card simultaneously passing through said first named means.

8. In card selecting mechanism, the combination of means adapted to pass there through a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having an arrangement of perforations in one predetermined group therein identical with the perforations in a corresponding group in said guide card passing simultaneously through said first named means.

9. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having certain predetermined perforations therein upon simultaneous passage through said mechanism of said guide card and said data card bearing such certain predetermined perforations.

10. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having certain predetermined perforations therein upon simultaneous passage through said mechanism of said guide card and said data card bearing such certain predetermined perforations, means adapted to receive cards selected by said selecting means and other means adapted to receive said data cards not selected by said selecting means.

11. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having certain predetermined perforations therein upon simultaneous passage through said mechanism of said guide card and said data card bearing such certain predetermined perforations, and means actuated by said card selecting and removing means upon the removal of a selected card, said means being adapted to insert in place of said removed data card a second card.

12. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, and selecting means actuated by the perforations in one predetermined group in said guide cards, said means being adapted to select and remove from said mechanism any of said data cards having certain predetermined perforations therein upon simultaneous passage through said mechanism of said guide card and said data card bearing such certain predetermined perforations, means adapted to receive cards selected by said selecting means and card inserting means, said means being actuated upon the receiving of a selected data card in said receiving means to insert a second card in the place of said removed card.

13. In card selecting mechanism, the combination of means adapted to pass therethrough a series of guide cards, guide cards having various perforations arranged in groups therein, other means adapted to pass therethrough a series of data cards, data cards bearing various perforations arranged in groups therein, selecting means actuated by the perforations in one predetermined group in said guide cards, said means being adapted to select and remove from said mechanism any of said data cards having certain predetermined perforations therein upon simultaneous passage through said mechanism of said guide card and said data card bearing such certain predetermined perforations, means adapted to receive cards selected by said selecting means, card inserting means, said means being actuated upon the receiving of a selected card in said receiving hopper to insert a second card in the place of said removed card, and means adapted to receive said unselected and inserted cards.

14. In card feeding means, the combination of two card conveying systems, a series of guide cards bearing variously arranged perforations, means for feeding said guide cards successively through one of said systems, a series of data cards also bearing various perforations, means for feeding said data cards through said second conveying systems simultaneously with said guide cards in said first named system, selecting means actuated by certain perforations in said guide cards, said means being adapted to select and remove from said second system any of said data cards having certain desired predetermined perforations therein upon simultaneous passage of said guide card and said data card of certain points in said two conveying systems, and other means adapted to insert a second card for each selected and removed data card in the same place and order in said series of data cards.

Signed by me this 21st day of June, 1922.

HOWARD C. EINSTEIN.